Figure 1:
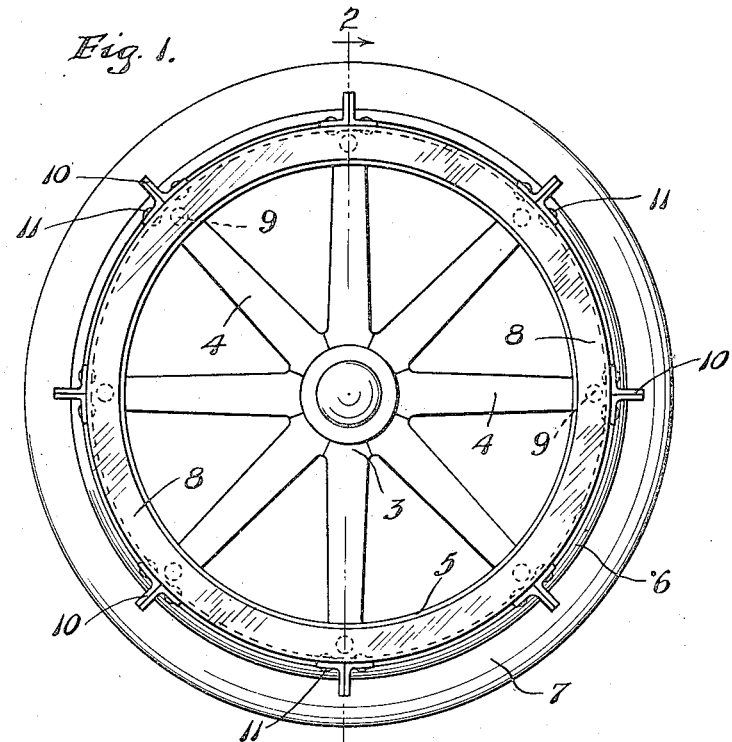

H. B. FOLEY.
SUPPLEMENTAL WHEEL RIM.
APPLICATION FILED NOV. 12, 1917.

1,293,746.

Patented Feb. 11, 1919.

WITNESSES.
H. L. Opsahl.
E. E. Wells

INVENTOR
H. B. FOLEY
BY HIS ATTORNEYS.

UNITED STATES PATENT OFFICE.

HUGH B. FOLEY, OF MINNEAPOLIS, MINNESOTA.

SUPPLEMENTAL WHEEL-RIM.

1,293,746.  Specification of Letters Patent.  Patented Feb. 11, 1919.

Application filed November 12, 1917. Serial No. 201,635.

*To all whom it may concern:*

Be it known that I, HUGH B. FOLEY, a citizen of the United States, residing at Minneapolis, in the county of Hennepin and State of Minnesota, have invented certain new and useful Improvements in Supplemental Wheel-Rims; and I do hereby declare the following to be a full, clear, and exact description of the invention, such as will enable others skilled in the art to which it appertains to make and use the same.

My invention has for its object to provide a supplemental wheel rim which is applicable to the wheels of trucks and like vehicles, to adapt them for use on soft soil, such as plowed ground. Particularly, the rim is adapted for application to the traction wheels of motor trucks, and when applied, will adapt such trucks for such use, for example, as a tractor to draw plows. Also, the rim especially adapts the wheels for use in snow and soft roads, generally.

Truck wheels, usually have metallic rims which hold a tire and which project beyond the sides of the wheel felly. When the supplemental rim is applied to the side of the wheel felly, it is set within and in contact with the adjacent projecting edge of the metallic rim, so that the shearing action, due to load on the supplemental rim is taken chiefly by the metallic rim of the wheel proper. The supplemental rim has circumferentially spaced radially projecting traction lugs, the outer edges of which have less radial projection from the axis of the wheel than does the tire of the wheel proper; and by this arrangement, the traction lugs are held out of contact with a hard road bed so that they will not damage the same.

In the accompanying drawings which illustrate the invention, like characters indicate like parts throughout the several views.

Figure 2:
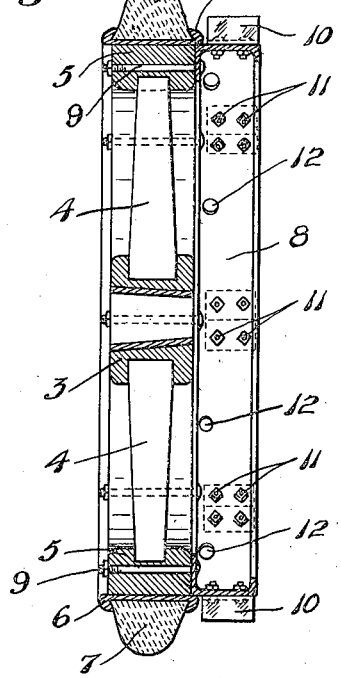

Referring to the drawings;

Figure 1 is a side elevation showing an ordinary truck wheel having my improved supplemental rim applied thereto; and Fig. 2 is a vehicle taken on the line 2—2 of Fig. 1.

Of the parts of the standard wheel, the numeral 3 indicates the hub, 4 the spokes, 5 the felly, 6 the metal rim and 7 the solid rubber tire. The rim 6, it will be noted, projects at both edges beyond the sides of the felly. Obviously, a pneumatic tire, might be employed instead of a solid rubber tire.

The supplemental rim 8 is of annular form and, at its inner side, at least, has an inwardly projecting flange through which, and the felly 5, circumferentially spaced nut-equipped bolts 9 are passed to detachably secure said supplemental rim to the said felly. This supplemental rim 8, it will be noted, is of such size that it telescopes into and closely engages with the projecting edge of the metal rim 6. Thus, as is obvious, the said rim 6 positively positions the supplemental rim concentric to the tire and takes the main shear or strain due to the load on the supplemental rim, and thereby almost entirely relieves the bolts 9 from shearing strain. Preferably, the annular supplemental rim 8 is provided at its outer edge with an inwardly extended reinforcing flange that is of less depth than the inner flange of the said rim. This makes the said supplemental rim channel-shaped in cross section, but it is not essential that the said rim should be of this form. The flange on the inner edge of the supplemental rim, by means of which it may be bolted to the felly is, however, of the utmost importance.

Rigidly, but detachably secured to the supplemental rim and projecting radially therefrom, are circumferentially spaced traction lugs 10 which, as shown, are each made of a pair of angle bar sections placed face to face and secured to said rim by short nut-equipped bolts 11. Here it is important to note that the outer edges of the traction lugs 10 have a very considerable less radial projection than those of the tire 7. Hence, when this wheel, with its attached supplemental rim and traction lugs, is run over a hard road bed, the traction lugs 10 will not come into contact with the roadbed and hence, will not damage or deface the roadbed. When the wheel is used in plowed ground or other soft soil, or in snow, it will settle until a large part of the weight of the load is taken on the supplemental rim, and when this takes place, a very wide faced rim is brought into action to sustain the load. Moreover, the traction lugs will then work in the ground or roadbed and will give greatly increased traction, such, for example, as required in plowed ground, to adapt the truck or other motor propelled vehicle to draw plows. When the supplemental rim is applied to traction wheels, the traction lugs are desirable, but when it is applied to a front wheel, or steering wheel, for example, the traction lugs would not be desirable. Obviously, when not desired, the traction lugs may be easily removed from the supplemental rim.

At suitable points between the traction lugs, the supplemental rim is provided with perforations 12 through which the customary non-skid chains may be applied to the wheel proper in the usual way. The supplemental rim is, of course, applied to the outer side of the wheel.

What I claim is:

The combination with a vehicle wheel having a cylindrical metal main rim surrounding its felly and projecting laterally therefrom, and a tire surrounding said main rim, a cylindrical supplemental rim having its inner edge telescoped within the projecting edge of said main rim and seated against the wheel felly, means rigidly but detachably securing said supplemental rim to the wheel felly in the position stated, and traction lugs directly and rigidly secured solely to the load carrying face of said supplemental rim, the said traction lugs projecting radially to points outward of said supplemental rim, but inward of the load carrying face of said tire.

In testimony whereof I affix my signature in presence of two witnesses.

HUGH B. FOLEY.

Witnesses:
CLARA DEMAREST,
F. D. MERCHANT.